(12) United States Patent
Bisson et al.

(10) Patent No.: US 10,850,863 B2
(45) Date of Patent: Dec. 1, 2020

(54) SYSTEM AND METHOD FOR OPERATING A MULTI-ENGINE AIRCRAFT IN AN AUXILIARY POWER UNIT MODE

(71) Applicant: PRATT & WHITNEY CANADA CORP., Longueuil (CA)

(72) Inventors: Jean-Francois Bisson, St-Amable (CA); Carmine Lisio, Laval (CA); Romain Chevalier, Montreal (CA); Dave Sellors, Burlington (CA); Yusuf Syed, Oakville (CA); Guy Riverin, Montreal (CA); Matthew Chiasson, Milton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 298 days.

(21) Appl. No.: 14/196,933

(22) Filed: Mar. 4, 2014

(65) Prior Publication Data
US 2015/0251770 A1 Sep. 10, 2015

(51) Int. Cl.
*B64D 41/00* (2006.01)
*B64D 31/06* (2006.01)
(Continued)

(52) U.S. Cl.
CPC .......... *B64D 41/00* (2013.01); *B64D 31/06* (2013.01); *B64D 35/08* (2013.01); *F02C 7/32* (2013.01);
(Continued)

(58) Field of Classification Search
CPC ........ B64D 31/02; B64D 31/06; B64D 31/14; B64D 35/00; B64D 35/02; G05D 1/0607; G05D 1/063
See application file for complete search history.

(56) References Cited

U.S. PATENT DOCUMENTS 2,123,219 A * 7/1938 Waseige ................. F16D 47/00
192/48.9
2,462,825 A * 2/1949 Zimmerman ........... F16D 25/00
192/129 A
(Continued)

FOREIGN PATENT DOCUMENTS

DE 42 39 639 A1 5/1994
FR 2992630 A1 * 1/2014 ............. B64C 27/04
(Continued)

OTHER PUBLICATIONS

MIT Center for Innovation in Product Development—DC Motor Torque/Speed Curve Tutorial, 1999, http://lancet.mit.edu/motors/motors3.html, accessed Nov. 7, 2015.*

*Primary Examiner* — Timothy D Collins
*Assistant Examiner* — Tye William Abell
(74) *Attorney, Agent, or Firm* — Norton Rose Fulbright Canada LLP

(57) ABSTRACT

At least a selected one of a first and second engine are connected to a drive train for driving an aircraft accessory. A gearbox is connected to a primer mover propulsor and an actuator operatively associated with the selected engine is moveable between a position in which the selected engine drivingly engages the gearbox for driving the propulsor and a position in which the selected engine disengages from the gearbox. A position signal, a status signal, and a request signal respectively indicative of a present position of the actuator, a governing state and present speed of each engine, and a request for movement of the actuator from the present position to the other position are received. If the selected engine's speed differs from a predetermined threshold, a control signal is output for causing the engine's speed to be adjusted towards the threshold. A control signal indicating that movement of the actuator is permitted is then output.

17 Claims, 6 Drawing Sheets

(51) Int. Cl.
    *B64D 35/08*     (2006.01)
    *F02C 9/42*     (2006.01)
    *F02C 7/32*     (2006.01)

(52) U.S. Cl.
    CPC .......... *F02C 9/42* (2013.01); *B64D 2041/002* (2013.01); *F05D 2270/02* (2013.01); *F05D 2270/023* (2013.01); *F05D 2270/304* (2013.01); *Y02T 50/44* (2013.01); *Y02T 50/671* (2013.01)

(56) References Cited

U.S. PATENT DOCUMENTS

| | | | | |
|---|---|---|---|---|
| 2,985,243 A * | 5/1961 | Tyler | ...................... | B64D 35/00 244/76 A |
| 3,103,604 A * | 9/1963 | Lear | ...................... | B64D 35/00 192/89.26 |
| 3,196,612 A * | 7/1965 | Laville | ................... | B64C 27/12 244/60 |
| 3,255,825 A * | 6/1966 | Mouille | .................. | B64C 27/12 244/60 |
| 3,290,963 A * | 12/1966 | Oldfield | ................. | F02C 7/277 244/60 |
| 3,362,255 A * | 1/1968 | De Rocca | ............... | B64C 27/12 192/47 |
| 3,514,055 A | 5/1970 | Gregoire et al. | | |
| 3,817,358 A * | 6/1974 | Hess | ....................... | F16D 23/12 192/103 R |
| 4,320,633 A * | 3/1982 | Humphrey | .............. | F16D 23/10 192/32 |
| 4,514,142 A | 4/1985 | Young | | |
| 4,807,129 A * | 2/1989 | Perks | .................... | B64C 13/503 244/17.13 |
| 4,875,643 A * | 10/1989 | Gietzen | ................... | B64C 27/14 123/179.27 |
| 4,915,200 A * | 4/1990 | Jacques | ................. | B64D 41/00 192/114 R |
| 5,054,716 A * | 10/1991 | Wilson | .................. | B64D 35/00 244/56 |
| 5,108,043 A * | 4/1992 | Canavespe | ............. | B64C 27/14 192/47 |
| 5,165,240 A * | 11/1992 | Page | ....................... | B64C 11/50 60/719 |
| 5,271,295 A * | 12/1993 | Marnot | .................. | B64C 27/14 244/58 |
| 6,059,691 A * | 5/2000 | McDonald | ........... | B60W 10/02 477/176 |
| 6,254,504 B1 * | 7/2001 | Goi | ......................... | B64C 27/14 475/216 |
| 7,628,355 B2 * | 12/2009 | Palcic | ..................... | B64C 27/10 244/17.11 |
| 7,698,884 B2 | 4/2010 | Maguire et al. | | |
| 7,805,947 B2 | 10/2010 | Moulebhar | | |
| 8,324,746 B2 | 12/2012 | Bradbrook | | |
| 2006/0066269 A1 * | 3/2006 | Lumley | .................. | B64D 31/02 318/135 |
| 2009/0140182 A1 * | 6/2009 | Agrawal | ................. | B64C 27/22 251/5 |
| 2010/0013223 A1 * | 1/2010 | Certain | .................... | B60K 6/24 290/31 |
| 2011/0220759 A1 * | 9/2011 | Stolte | ..................... | B64D 35/00 244/60 |
| 2012/0153074 A1 * | 6/2012 | Nannoni | .............. | G05D 1/0858 244/17.13 |
| 2013/0098179 A1 | 4/2013 | Beier et al. | | |
| 2013/0184903 A1 * | 7/2013 | Evrard | .................... | B64D 31/06 701/15 |
| 2014/0067166 A1 * | 3/2014 | Hartman | ................ | H02P 7/06 701/3 |
| 2014/0145028 A1 * | 5/2014 | Gomez | .................... | B64C 27/12 244/58 |
| 2014/0252161 A1 * | 9/2014 | Gukeisen | ............... | B64D 27/14 244/60 |
| 2014/0297155 A1 * | 10/2014 | Chen | ........................ | F02C 9/28 701/100 |
| 2015/0143950 A1 | 5/2015 | Bedrine et al. | | |
| 2015/0191250 A1 * | 7/2015 | DeVita | .................... | B64C 27/12 701/3 |

FOREIGN PATENT DOCUMENTS

GB             691 571 A       5/1953
WO    WO-2009111705 A1 *  9/2009  ........ B64C 29/0033

* cited by examiner

SYSTEM AND METHOD FOR OPERATING A MULTI-ENGINE AIRCRAFT IN AN AUXILIARY POWER UNIT MODE

TECHNICAL FIELD

The application relates generally to the control of a multi-engine aircraft, and in particular to operating an engine on the aircraft in an auxiliary power unit mode.

BACKGROUND OF THE ART

An auxiliary power unit (APU) is typically used in aircraft to provide various functionalities, such as an independent power drive as an adjunct to a primary engine. For example an APU may be used to provide back-up power to the electrical power system of an aircraft, while the aircraft is grounded or during an in-flight emergency. A dedicated APU may further be used to drive aircraft-mounted accessories without driving the aircraft's main rotor. However, having such a dedicated APU causes an increase in the weight and complexity of the aircraft systems.

There is therefore a need for an improved system and method for operating an engine on the aircraft in an auxiliary power unit mode.

SUMMARY

In one aspect, there is provided an aircraft system comprising at least a first engine and a second engine, at least the first engine operatively connected to an accessory drive train for driving an aircraft accessory; a gearbox operatively connecting at least the first engine and the second engine to a prime mover propulsor of the aircraft; an actuator operatively associated with at least the first engine and moveable between a first position in which at least the first engine drivingly engages the gearbox for driving the propulsor, and a second position in which at least the first engine is disengaged from the gearbox; and a processing unit coupled to the actuator, the processing unit receiving a status of a present position of the actuator, the present position being the first position in which at least the first engine drives the aircraft accessory and drivingly engages the gearbox for driving the propulsor; receiving a status of a present governing state and a present speed of at least the first engine and the second engine; receiving a request for movement of the actuator from the first position to the second position; comparing, in response to the request for movement of the actuator and upon determining that the aircraft is on the ground, the present speed of at least the first engine to a predetermined speed threshold; outputting, when the present speed of at least the first engine differs from the predetermined speed threshold, a first control signal for causing the present speed of at least the first engine to be adjusted towards the predetermined speed threshold, wherein, when at least the first engine operates at the predetermined speed threshold, substantially zero torque is applied on the gearbox by at least the first engine and a given speed difference is achieved between the present speed of at least the first engine an the present speed of the second engine; and outputting, when the present speed of at least the first engine corresponds to the predetermined speed threshold, a second control signal to move the actuator from the first position to the second position, thereby causing at least the first engine to be disengaged from the gearbox and to only drive the aircraft accessory.

In another aspect, there is provided a method comprises for controlling an aircraft system, the method comprising, at a processing unit, receiving a status of a present position of an actuator, the actuator operatively associated with at least a first engine of the aircraft, at least the first engine moveable between a first position in which at least a first engine drives an aircraft accessory and drivingly engages a gearbox for driving a propulsor of the aircraft, and a second position in which at least the first engine is disengaged from the gearbox and only drives the aircraft accessory, the present position being the first position; receiving a status of a present governing state and a present speed of at least the first engine and a second engine; receiving a request for movement of the actuator from the first position to the second position; comparing, in response to the request for movement of the actuator and upon determining that the aircraft is on the ground, the present speed of at least the first engine to a predetermined speed threshold; outputting, when the present speed of at least the first engine differs from the predetermined speed threshold, a first control signal for causing the present speed of at least the first engine to be adjusted towards the predetermined speed threshold, wherein when at least the first engine operates at the predetermined speed threshold, substantially zero torque is applied on the gearbox by at least the first engine and a given speed difference is achieved between the present speed of at least the first engine and the present speed of the second engine and outputting, when the present speed of at least the first engine corresponds to the predetermined speed threshold, a second control signal to move the actuator from the first positron to the second position.

In a further aspect, there is provided system for controlling an aircraft, the system comprising means for receiving a status of a present position of an actuator, the actuator operatively associated with at least a first engine of the aircraft, at least the fast engine moveable between a first position in which at least the first engine drives an aircraft accessory and drivingly engages a gearbox for driving a propulsor of the aircraft, and a second position in which at least the first engine is disengaged from the gearbox and only drives the aircraft accessory, the present position being the first position, means for receiving a status of a present governing state and a present speed of at least the first engine and a second engine, means for receiving a request for movement of the actuator from the first position to the second position; means for comparing, in response to the request for movement of the actuator and upon determining that the aircraft is on the ground the present speed of at least the first engine to a predetermined speed threshold; means for outputting, when the present speed of at least the first engine differs from the predetermined speed threshold, a first control signal for causing the present speed of at least the first engine to be adjusted towards the predetermined speed threshold, wherein, when at least the first engine operates at the predetermined speed threshold, substantial zero torque is applied on the gearbox by at least the first engine and a given speed difference is achieved between the present speed of at least the first engine and the present speed of the second engine; and means for outputting, when the present speed of at least the first engine corresponds to the predetermined speed threshold, a second control signal to move the actuator from the first position to the second position.

DESCRIPTION OF THE DRAWINGS

Reference is now made to the accompanying figures in which.

DETAILED DESCRIPTION

Figure 1:
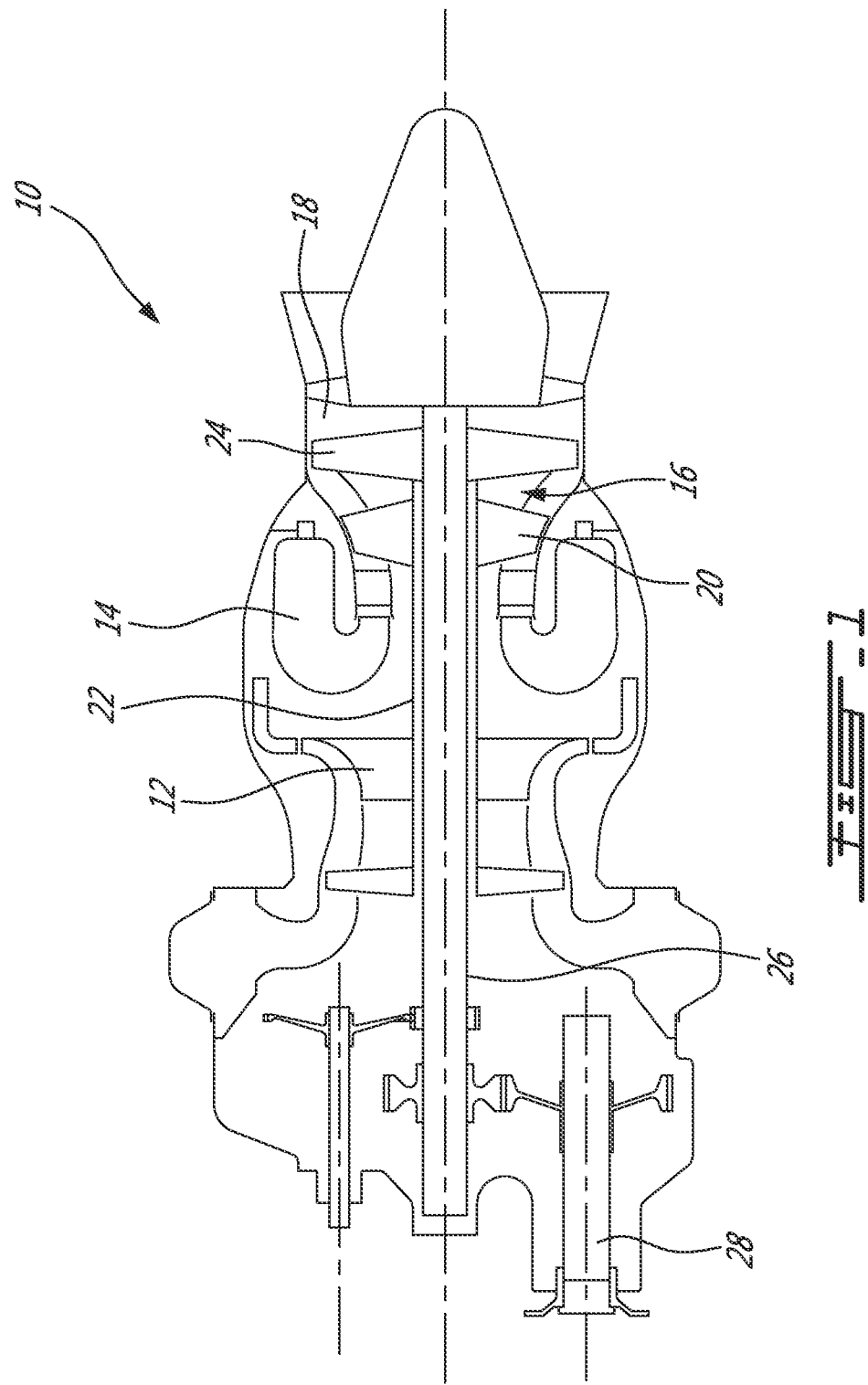
FIG. 1 is a schematic cross-sectional view of a gas turbine engine with a free power turbine spool, applicable for use with a system for controlling a multi-engine aircraft as described herein.

FIG. 1 illustrates a gas turbine engine with a free power turbine spool 10 of a type preferably provided for use in subsonic flight, generally comprising in serial flow communication, a compressor section 12 for pressurizing the air, a combustor 14 in which the compressed air is mixed with fuel and ignited for generating an annular stream of hot combustion gases, and a turbine section 16 for extracting energy from the combustion gases. The combustion gases flowing out of the combustor 14 circulate through the turbine section 16 and are expelled through an exhaust duct 18. The turbine section 16 includes a compressor turbine 20 in driving engagement with the compressor section 12 through a high pressure shaft 22, and a power turbine 24 in driving engagement with a power shaft 26. The power shaft 26 is in driving engagement with an output shaft 28 through a reduction gearbox (not shown). Although illustrated as a turboshaft engine, the gas turbine engine 10 may alternatively be another type of engine, for example a turboprop engine, also generally comprising in serial flow communication a compressor section, a combustor, and a turbine section, and a propeller through which ambient air is propelled.

Figure 2:
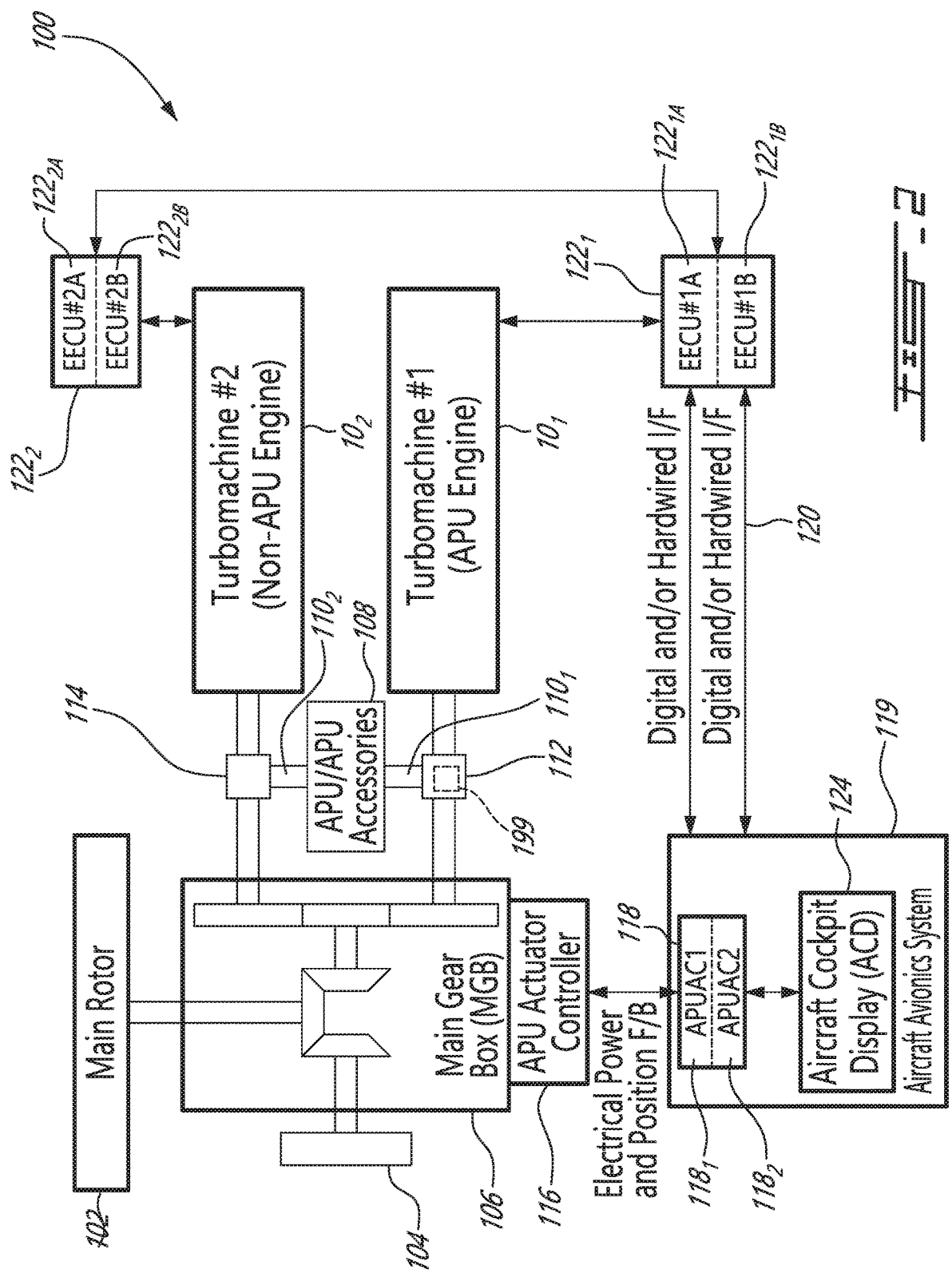
FIG. 2 is a schematic diagram of a system for controlling a multi-engine aircraft, in accordance with an illustrative embodiment.

Referring now to FIG. 2, a system 100 for controlling a multi-engine aircraft comprising at least a first and a second one of the engine of FIG. 1 will now be described. In particular, the system 100 is illustratively used for activating a ground only mode of operation, e.g. an Auxiliary Power Unit (APU) mode, in a twin engine helicopter having at least a first (e.g. APU) engine $10_1$ and a second (e.g. Non-APU) engine $10_2$ installed thereon. It should be understood that, although the system 100 is shown is illustrated and described as being used for a twin engine helicopter, other aircraft than helicopters and aircraft comprising more than two (2) engines as in $10_1$ and $10_2$ may also apply.

A main rotor gearbox (MGB) or transmission 106 is illustratively used to connect the first engine $10_1$ and the second engine $10_2$ to a main rotor 102 and a tail rotor 104 of the aircraft, which constitute the aircraft prime mover propulsor. It should be understood that, in some embodiments, the MGB 106 may be used to connect the engines $10_1$, $10_2$ to a propeller. An APU and/or APU accessories 108 are also illustratively provided on the aircraft for various purposes, such as the provision of electrical power and/or pneumatic air to the aircraft in certain stages of engine operation. The APU/APU accessories 108 may therefore comprise, but are not limited to, power sources, hydraulic pumps, environmental control systems, and the like. It should be understood that various other APU/APU accessories 108 used for a variety of purposes may apply. The APU/APU accessories 108 are illustratively driven by a first and a second dedicated accessory drive train $110_1$, $110_2$, e.g. the output shaft (reference 28 in FIG. 1). Each one of the engines $10_1$ and $10_2$ is illustratively normally connected to a respective one of the accessory drive trains $110_1$, $110_2$, respectively via a first clutch (not shown) comprised in a clutch and APU actuator system 112 operatively connected to the engine $10_1$ and a second clutch (not shown) comprised in a clutch system 114 operatively connected to the engine $10_2$. In this manner, the engines $10_1$ and $10_2$ are each adapted to transmit drive (e.g. their rotational output) to the APU/APU accessories 108. One type of clutch used is commonly known as a Sprag clutch.

The clutch and APU actuator system 112 is in turn operatively connected to the MGB 106, the engine $10_1$, and the accessory drive train $110_1$ while the clutch system 114 is operatively connected to the MGB 106, the engine $10_2$, and the accessory drive train $110_2$. Connection via the clutch system 114 then enables the engine $10_2$ to drive the main and tail rotors 102, 104 as well as the APU/APU accessories 108. In one embodiment, the clutch and APU actuator system 112 comprises an APU actuator 199 (e.g. an airframe actuator) moveable between a first (or Main Gearbox, MGB) position and a second (or APU Only) position for selectively controlling driving of the main and tail rotors 102, 104 and the APU/APU accessories 108 by the engine $10_1$. Although reference is made herein to the APU actuator 199 being used to control driving of the main and tail rotors 102, 104 and the APU/APU accessories 108 by the engine $10_1$, it should be understood however that such an APU actuator 199 may alternatively be provided in the clutch system 114 for controlling driving of the main and tail rotors 102, 104 and the APU/APU accessories 108 by the engine $10_2$.

The clutch and APU actuator system 112 is illustratively configured such that, when the APU actuator is in the first position, the engine $10_1$ is engaged to the MGB 106 and drives the main and tail rotors 102, 104 as well as the APU/APU accessories 108. When the APU actuator of the APU actuator system 112 is in the second position, the engine $10_1$ is disengaged from the MGB 106 so as to drive the APU/APU accessories 108 without driving the main and tail rotors 102, 104. In this case, a single engine, e.g. the non-APU engine $10_2$, drives the main and tail rotors 102, 104. This eliminates the need for a dedicated APU and related systems on the aircraft, thereby simplifying and reducing the weight of the aircraft. When the APU actuator is in the first position, the control system 100 accordingly operates in a first (or normal) mode of operation while it operates in a second (or APU) mode of operation, which is illustratively a ground only mode of operation, when the APU actuator is in the second position.

The system 100 further comprises an APU actuator controller 116 that is in electrical communication with the APU actuator provided in the clutch and APU actuator system 112 for controlling an operation of the APU actuator. In particular, and as will be discussed further below, in response to receiving from the aircraft (e.g. from the pilot) a request signal indicative of a request to move the APU actuator from one position to the next, the APU actuator controller 116 outputs a control signal to cause movement (e.g. start/stop/control of direction) of the APU actuator of the clutch and APU actuator system 112. In response, the APU actuator will be moved from a present position to a requested (i.e. desired) position, which is one of the first position and the second position. The controller 116 is illustratively a programmable logic controller, and as such, may include a general purpose programmable processor, computer storage memory, and a plurality of input and output ports (not shown). In one embodiment, the APU actuator controller 116 is connected to an Auxiliary Power Unit Aircraft Controller (APUAC) 118 of an aircraft avionics system 119. The APU actuator controller 116 then communicates to the APUAC 118 feedback signals indicative of a current position (i.e. first or second position) of the APU actuator of the clutch and APU actuator system 112. The APU actuator controller 116 may further communicate electrical power feedback to the APUAC 118.

The APUAC 118 then sends via a communication channel 120 the data received from the APU actuator controller 116 to an Electronic Engine Control Unit (EECU) $122_1$ connected to engine $10_1$. The communication channel 120 illustratively comprises a digital and/or hardwired interface and uses any suitable communication standard, such as the ARINC 429 data transfer standard or the like, and may therefore be an ARINC 429 digital data bus. As discussed above, in an alternate embodiment, the clutch system 114 may comprise an APU actuator that is controlled by the APU actuator controller 116 rather than the APU actuator being provided in the clutch and APU actuator system 112 and it should therefore be understood that the APUAC 118 may alternatively communicate with a second EECU $122_2$ connected to the engine $10_2$.

Each EECU $122_1$ or $122_2$ illustratively comprises one or more computing devices (not shown) in communication with the hardware of the corresponding engine $10_1$, $10_2$ for controlling an operation thereof. The computing devices may include, but are not limited to, a digital computer, a processing unit (e.g. a microprocessor, general purpose programmable processor, or the like), a memory, and a plurality of input and output ports (not shown). In particular, the EECU $122_1$ or $122_2$ may be a multi-channel controller comprising a number of independent control channels, e.g. two (2) control channels as in $122_{1A}$ (e.g. channel A) and $122_{2A}$ (e.g. channel B) (and accordingly two (2) control channels $122_{2A}$, $122_{2B}$ for EECU $122_2$), as illustrated. Each channel $122_{1A}$, $122_{2A}$ (and similarly channels $122_{2A}$, $122_{2B}$) may then be connected to a corresponding one of a first APUAC module $118_1$ and a second APUAC module $118_2$ of the APUAC 118 and receive data therefrom. In particular and as will be discussed further below, the APUAC modules $118_1$, $118_2$ may communicate to the EECU $122_1$ or $122_2$ signals indicative of the present position of the APU actuator of the clutch and APU actuator system 112. It should be understood that the EECUs $122_1$, $122_2$ and the APUAC 118 may be single-channel devices.

The APUAC 118 and EECU $122_1$ or $122_2$ may also exchange a plurality of input and output signals (or flags) that may be used to ensure synchronization between the aircraft avionics systems 119 and the EECU $122_1$ or $122_2$ for providing the APU mode of operation. As will be discussed further below, the EECU $122_1$ or $122_2$ may then process the received data to determine when it is acceptable to move the APU actuator from the present position to the requested position. The EECU $122_1$ or $122_2$ may also output a control signal to the APU actuator controller 116 (via the APUAC 118) for providing to the APU actuator controller 116 an indication that movement of the APU actuator is permitted. Upon receiving control signals from the EECU $122_1$ or $122_2$, the APU actuator controller 116 may cause the desired movement of the APU actuator to occur. As will be discussed further below, the EECU $122_1$ or $122_2$ may also receive an indication of the governing state and present speed of the engines $10_1$ and $10_2$ and, upon processing the received data, output to the engines $10_1$ and $10_2$ a control signal for causing adjustment of a speed thereof (e.g. achieving a speed split) in order to prevent possible mechanical damage to the MGB 106.

The system 100 may further comprise an aircraft cockpit display (ACD) 124 configured to communicate with the APUAC 118 and receive therefrom data to be rendered on the ACD 124 for cockpit display. For instance, the APUAC 118 may send to the ACD 124 data received from the APU actuator controller 116, the data indicative of a present position of the APU actuator of the clutch and APU actuator system 112. The APUAC 118 may also transmit to the ACD 124 data received from the EECU $122_1$ or $122_2$, for instance data indicative of a feedback response to the APU request (i.e. the request to move the actuator), of a status of the APU mode of operation, as well as of a failure and/or inhibition of the normal mode or APU mode. It should be understood that any other suitable data may be exchanged with the ACD 124. Also, any data received at the ACD 124 may be rendered thereon in a manner known to those skilled in the art.

Figure 3:
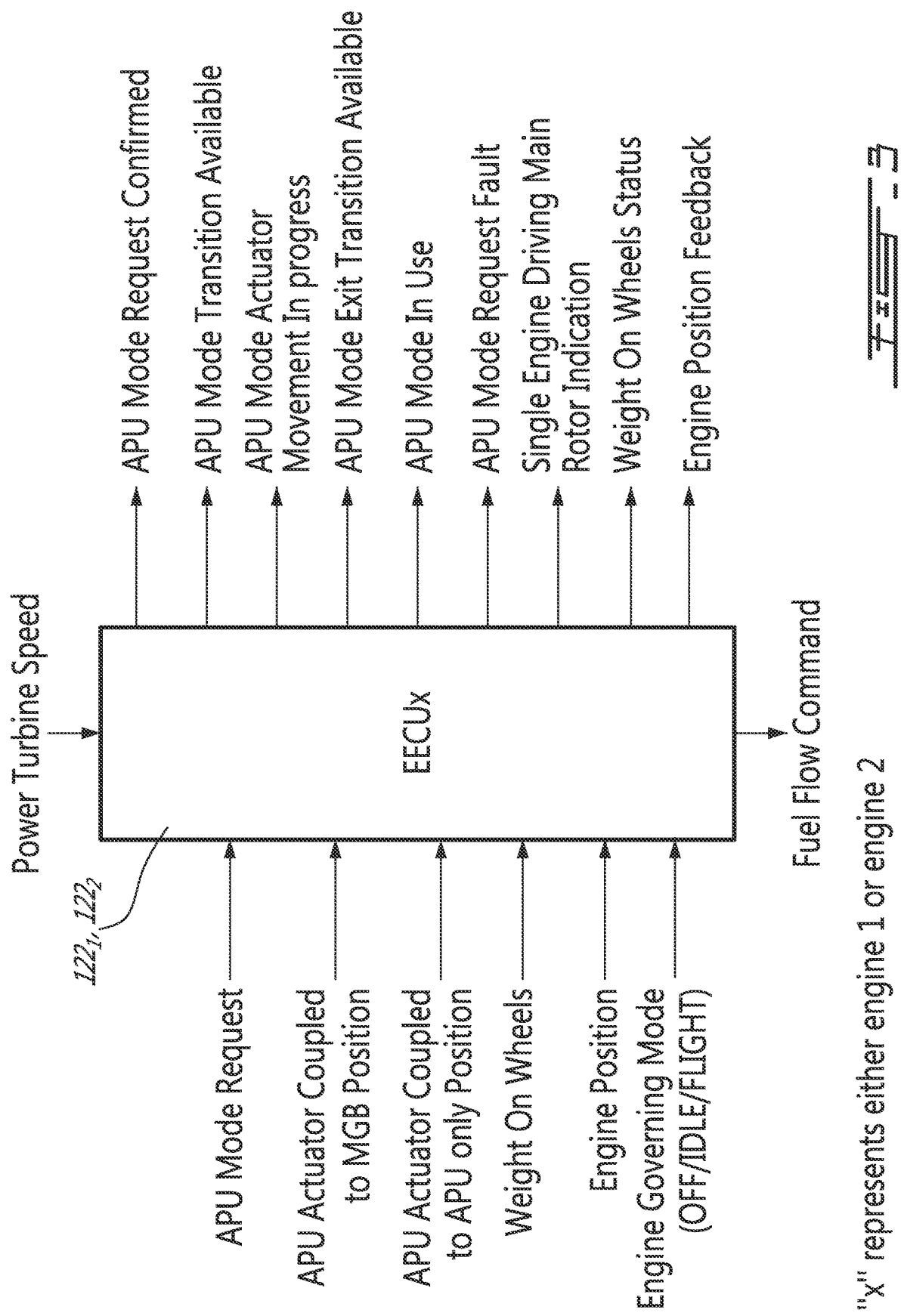
FIG. 3 is a schematic diagram of input signals received at and output signals output by the Electronic Engine Control Unit (EECU) of FIG. 2 for providing an auxiliary power unit (APU) mode of operation, in accordance with an illustrative embodiment.

Referring now to FIG. 3 in addition to FIG. 2, there is illustrated information (e.g. input/output data signals or flags) that flows between the aircraft systems (e.g. the APU Actuator controller 116, the engines $10_1$, $10_2$, and the airframe) and the EECU $122_1$ or $122_2$ for achieving synchronization between the aircraft systems and the EECU $122_1$ or $122_2$ while implementing the APU mode functionality for a given one of the engines $10_1$, $10_2$, e.g. the engine $10_1$. Such synchronization ensures that movement of the APU actuator is performed at a suitable point in time in accordance with the state of the engines $10_1$, $10_2$, and the status of the APU actuator, thereby reducing engine instability. It should be understood that, depending on the embodiments, input/output signals or flags other than the ones described herein may be received at/output by the EECU $122_1$ or $122_2$ for achieving the desired synchronization. Also, although the description below will refer to the EECU $122_1$ for sake of simplicity and clarity, it should be understood that reference may similarly be made to EECU $122_2$.

In one embodiment, the EECU $122_1$ receives an "APU Mode Request" signal, the signal indicating that a request for transitioning from the normal mode where the APU actuator of the clutch and APU actuator system 112 is in the first position to the APU mode where the APU actuator will be moved to the second position (i.e. a request for disengaging the engine $10_1$ from the MGB 106) has been made (e.g. upon selection by the pilot of a suitable input means). When the APU actuator has reached the first or MGB position, as determined by the APU actuator controller 116, the EECU $122_1$ further receives from the APU actuator controller 116 (via the APUAC 118) an "APU Actuator Coupled to MGB Position" signal indicative of the event (e.g. of the status of the engine decoupling process). When the APU actuator 114 has reached the second or APU only position, the EECU $122_1$ accordingly receives an "APU Actuator Coupled to APU only Position" signal. The EECU $122_1$ may further receive an air/ground signal indicative of whether the aircraft is airborne or on the ground. For instance, a "Weight On Wheels" (WOW) signal, which is indicative of whether the aircraft has weight on its wheels may be received. An "Engine Governing Mode (OFF/IDLE/FLIGHT)" signal indicative of a governing state of the engine (e.g. idle, flight, shutdown) may also be received at the EECU $122_1$. An "Engine Position" signal indicative of which engine $10_1$, $10_2$ is left or right (LHE, RHE) and a "Power Turbine Speed" signal indicative of the engine's power turbine speed are also illustratively received at the EECU $122_1$.

The EECU $122_1$ then extracts data from the received input signals, processes the extracted data, and in turn generates a plurality of output signals, which may be transmitted to the engine $10_1$, to the ACD 124 (via the APUAC 118), and/or to the APU actuator controller 116 (via the APUAC 118) for permitting/causing the APU actuator of the clutch and APU actuator system 112 to transition from one position (e.g. first or MGB position) to the other (e.g. second or APU Only position). For instance, upon receiving the "APU Mode Request" signal, the EECU $122_1$ may output an "APU Mode Request Confirmed" signal, which provides a confirmation that the APU mode request has indeed been received. The EECU $122_1$ may also output an "APU Mode Transition Available" signal that indicates to the airframe that movement of the APU actuator is now available, i.e. permission to move the APU actuator may be requested. After a request for transitioning the APU actuator from one position to the other has been received, the EECU $122_1$ may output an "APU Mode Actuator Movement In Progress" signal. This signal may indicate that the APU actuator is authorized to transition from the present (e.g. first or MGB position) towards the desired (e.g. second or APU Only) position and that the APU actuator controller 116 may now accordingly control the APU actuator to move to the requested position. Upon receiving the "APU Actuator Coupled to APU only Position" signal, the EECU $122_1$ may output an "APU Mode In Use" signal, which indicates that the APU actuator has reached the requested (e.g. second or APU only) position and that the engine $10_1$ is now fully disengaged from the main rotor 102 and tail rotor 104, i.e. that the engine $10_1$ drives the APU/APU accessories 108 only. A "Single Engine Driving Main Rotor Indication" signal may also be output to indicate that only one of the engines $10_1$, $10_2$ is driving the main rotor 102.

Figure 4:
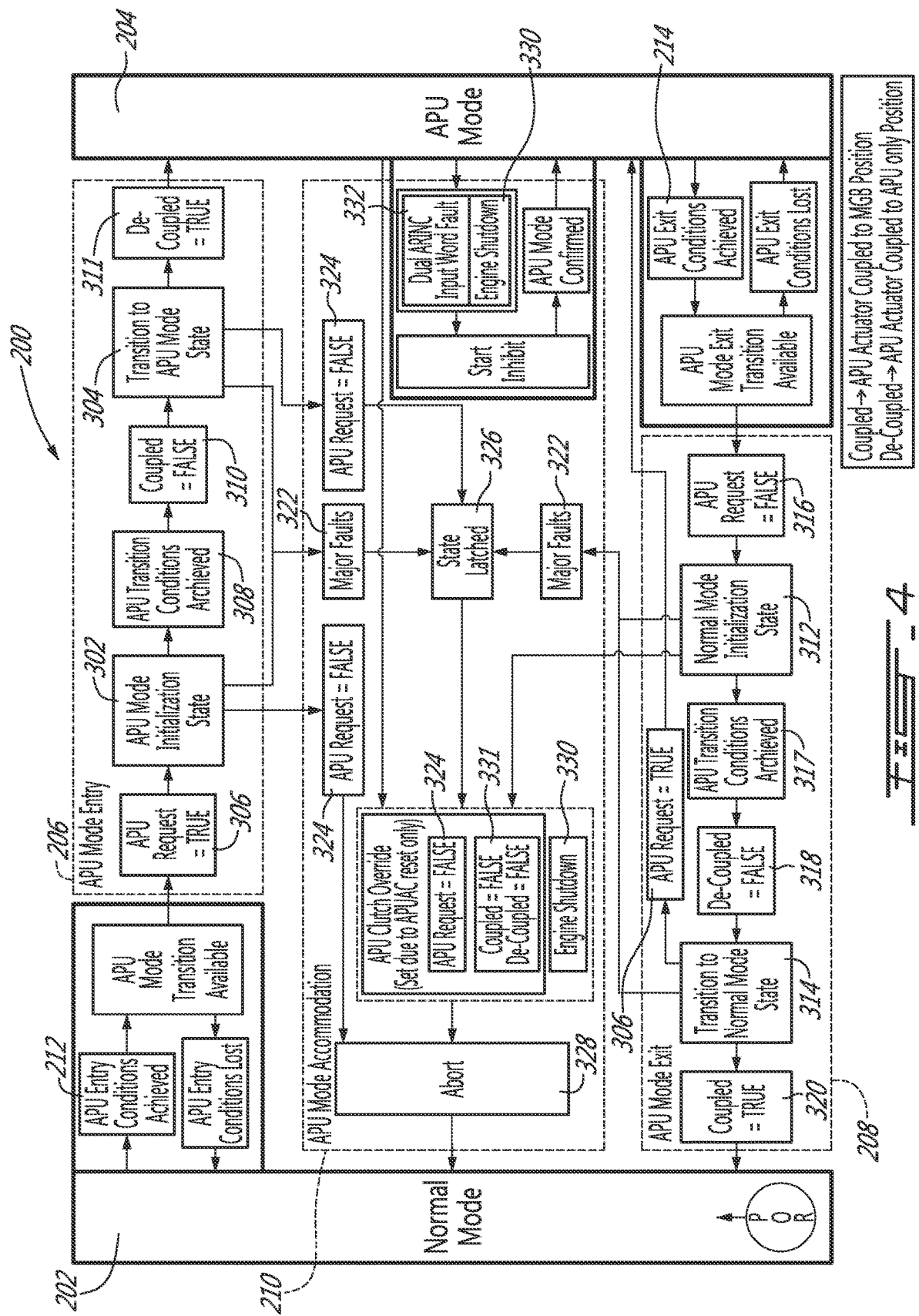
FIG. 4 is a schematic diagram of state transitioning logic implemented by the EECU of FIG. 2 for transitioning between a normal mode of operation and the APU mode of operation, in accordance with an illustrative embodiment.

Still referring to FIG. 3 in addition to FIG. 2, the EECU $122_1$ may detect from the received input signals that a given one of the control channels $122_{1A}$, $122_{2B}$ (or $122_{2A}$, $122_{2B}$) from which the data is received is not functioning properly. The EECU $122_1$ may accordingly output an "APU Mode Request Fault" signal indicative of a channel or input fault. Feedback may then be provided to the airframe (e.g. via the ACD 124) that the channel inputs are faulted. When in the APU mode of operation, the EECU $122_1$ may determine that the APU actuator 114 may transition back to the MGB position and accordingly outputs an "APU Mode Exit Transition Available" signal. Such a signal provides an indication that the engine $10_1$ may now be reconnected to the MGB 106 and accordingly drive the main and tail rotors 102, 104. Further to receiving the "Engine Position" signal, the EECU $122_1$ may also output an "Engine Position Feedback" signal that provides an indication of the engine $10_1$ or $10_2$ which can run in APU mode only and the engine $10_1$ or $10_2$ for which it is desirable to maintain a speed split during transitions to or from the APU mode configuration. When the EECU $122_1$ determines from the governing state of the engines $10_1$ and $10_2$ that the engine speeds are to be adjusted to unload the MGB 106 prior to disengaging the engine $10_1$, the EECU $122_1$ may output a signal that provides an indication thereof. A "Fuel Flow Command" signal may be output accordingly (e.g. further to receiving the "Power Turbine Speed" signal) to the engine(s) $10_1$ and/or $10_2$ to cause the speed adjustment. Further to receiving the air/ground signal, e.g. the "Weight On Wheels" signal, the EECU $122_1$ may also output an air/ground status signal, e.g. a "Weight On Wheels Status" signal, to provide an indication of the status of the aircraft (e.g. airborne or on the ground). Referring now to FIG. 4 in addition to FIG. 2 and FIG. 3, there is shown an illustrative state transitioning schematic 200 that describes the logic implemented by the EECU $122_1$ for transitioning between the normal mode of operation 202 and the APU mode of operation 204. The transition is illustratively performed by going through one or more of an APU Mode Entry state 206, an APU Mode Exit state 208, and an APU Accommodation state 210. The EECU $122_1$ transitions through the states in accordance to various entry and exit conditions and having knowledge of the status (e.g. governing state, speed) of each engine $10_1$, $10_2$. In particular, when in the Normal Mode 202, the EECU $122_1$ may determine from the engine status whether the APU entry conditions 212 have been achieved, thereby determining whether to allow entry into APU Mode 204. In particular, the APU Mode 204 being a ground only mode, the EECU $122_1$ may enter the APU Mode 204 only when the aircraft is on the ground, as indicated from the received air/ground signal. In one embodiment, a "Weight On Wheels" (WOW) signal is used to determine if the aircraft is in a ground mode. It should however be understood that other suitable signals, such as airspeed, altitude, rotor speed, and/or other suitable indicators may be used either with or in place of WOW. In one embodiment, the logic implemented by the EECU $122_1$ allows to detect conflicting states and may send a fault indication accordingly. In addition transition to/from APU is illustratively inhibited until the conflicting conditions or faults are cleared.

If the APU entry conditions 212 are lost (e.g. the aircraft is airborne), the EECU $122_1$ remains in the Normal Mode 202 and no transition to the APU Mode 204 may occur. Otherwise, if the APU entry conditions 212 are present, the EECU $122_1$ determines that the APU mode 204 may be entered and provides an indication transition to APU mode is available or permitted. For this purpose, the "APU Mode Transition Available" signal may be output. Once it is determined that the APU mode is available, the EECU $122_1$ then moves to the APU Mode Entry state 206, which illustratively comprises an APU Mode Initialization State 302 and a Transition to APU Mode State 304. When the transition condition "APU Request=TRUE" 306 is satisfied, i.e. upon receiving a request to move the APU actuator and enter the APU Mode 204 (e.g. in response to pilot selection), the EECU $122_1$ may then output the "APU Mode Request Confirmed" signal and enter the APU Mode Initialization State 302.

The APU Mode Initialization State 302 may be implemented to ensure that the engine $10_1$ is decoupled (i.e. applying no torque to the MGB 106) from the main and tail rotors 102,104, therefore taking no load therefrom. This may already be achieved based on the current governing state of the engine $10_1$, for example if the engine $10_1$ is shutdown. However, if the engine $10_1$ is not already decoupled, the EECU $122_1$ may, in the APU Mode Initialization State 302, adjust the governing speeds of the engines $10_1$ and/or $10_2$ to attain and maintain a speed split desirable for successful decoupling of the engine $10_1$ and preventing possible mechanical damage to the MGB 106. In particular, it is desirable for the engine (e.g. APU mode engine $10_1$) transitioning to or from APU mode 204 to be decoupled or unloaded with a minimum speed split for the transition to occur, the speed split being illustratively engine specific. Indeed, it is desirable for the speed split to be maintained during transition by at least one of reducing the speed of one engine and increasing the speed of the other engine. In one embodiment, the speed of the APU mode engine $10_1$ is adjusted while the speed of the Non-APU engine $10_2$ (i.e. the engine engaged to the MGB) is held to a given level until the transition to/from APU mode is successfully completed. In one embodiment, it may be desirable for a speed split or difference of 5% to be achieved between the engines $10_1$, $10_2$. Other suitable speed splits may apply.

In particular, if both engines $10_1$ and $10_2$ are governing at flight, as indicated in the "Engine Governing Mode" signal received at the EECU $122_1$, the EECU $122_1$ outputs a control signal to cause the engine $10_1$ to decrease its propeller or shaft (Np) speed towards a predetermined speed threshold, e.g. an APU transition speed, that may be stored in memory and retrieved therefrom. The APU transition speed setting is illustratively determined so as to set the lowest available torque output when engaging/disengaging the engine $10_1$. If the engine $10_1$ is governing at idle and the engine $10_2$ is governing at flight, the speed split may already be achieved. The EECU $122_1$ may output a control signal to cause the engine $10_1$ to hold or increase its shaft speed towards the threshold. The threshold may be determined such that the engine $10_1$ operating at this threshold applies no torque on the MGB 106, thereby being and remaining decoupled with a desired speed split (may be stored in memory) between the engines $10_1$, $10_2$.

Once engine $10_1$ is decoupled from the main and tail rotors 102, 104, e.g. the transition conditions "APU Transition Conditions Achieved" 308 is satisfied, the EECU $122_1$ may then enter the APU Mode Transition state 304. The EECU $122_1$ may further send an indication ("APU Mode Actuator Movement In Progress" signal) to the aircraft (i.e. to the APU Actuator Controller 116 via the APUAC 118) that actuator movement is now permitted (e.g. because the engine $10_1$ is stabilized at the speed threshold). In response to receiving the signal from the EECU $122_1$, the APU actuator controller 116 then sends a control signal to the APU actuator of the clutch and APU actuator system 112 to cause the APU actuator to move to the second position, thereby disengaging the engine $10_1$ from the MGB 106, and thus from the main and tail rotors 102, 104. During the transition, the EECU $122_1$ will then transition an MGB mode indication (indicates whether APU actuator is in first position, e.g. APU actuator coupled to MGB position, or not) to 'false' ("Coupled=FALSE" 310). The APU actuator controller 116 illustratively sends to the EECU $122_1$ (via the APUAC 118 and communication link 120) a position signal indicative of the present position of the APU actuator. Once the EECU $122_1$ determines from the data received from the APU actuator controller 116 that the movement of the APU actuator is complete, i.e. the APU actuator has been moved from the first or APU Actuator Coupled to MGB position to the second or APU Actuator Coupled to APU only position, the EECU $122_1$ may then transition an APU Mode indication (indicates whether APU actuator is in second position, e.g. APU actuator coupled to APU only position, or not) to 'true' ("De-coupled=TRUE").

When the transition condition "De-coupled=TRUE" 311 is satisfied, i.e. the EECU $122_1$ has confirmed that the APU actuator is in the second position and the engine $10_1$ is disengaged from main and tail rotors 102, 104, the EECU $122_1$ may then enter the APU mode 204 and output an indication thereof ("APU Mode In Use" signal) to the aircraft systems. It should be understood that the "APU Mode In Use" signal may alternatively be output by the EECU $122_1$ as soon as the latter enters the APU Mode Initialization State 302. Upon entering the APU Mode 204, the EECU $122_1$ further outputs a control signal to the engine $10_1$ to cause the latter to adjust its governing speed, as discussed above. In particular, the EECU $122_1$ may cause the engine $10_1$ to increase its speed from the speed threshold towards a predetermined governing speed reference associated with the APU mode of operation, thereby returning the engine $10_1$ to the governing state. In one embodiment, when the EECU $122_1$ is in the APU mode 204, the engine $10_1$ has a speed set above that of the engine $10_2$ with a given speed difference or speed split between the engine speeds. This may then ensure that the engine $10_2$ does not drive the APU/APU accessories 108 through the clutch system 114 and that only the engine $10_1$ drives the APU/APU accessories 108 while both engines $10_1$, $10_2$ are at FLIGHT.

Still referring to FIG. 4, exit from the APU Mode 204 towards the Normal Mode 202 may be performed in a manner similar to entry into APU mode 204 (discussed above). In particular, when in the APU Mode 204, the EECU $122_1$ determines whether the APU Exit conditions 214, e.g. the aircraft is not airborne, Non-APU engine $10_2$ is in the same state or higher than APU engine $10_1$ (e.g. "Engine Governing Mode" signal indicates a selection of either FLIGHT vs. FLIGHT, FLIGHT vs. IDLE or FLIGHT vs. OFF), are present. If this is not the case and the APU exit conditions 214 are lost, the EECU $122_1$ remains in APU Mode 204. Otherwise, the EECU determines that the Normal Mode is available (i.e. may be entered) and outputs an indication thereof ("APU Mode Exit Transition Available" signal) to the aircraft systems. It should be understood that the EECU $122_1$ may also output the "APU Mode Exit Transition Available" signal as soon as the engine $10_1$ has been returned to its governing state. The EECU $122_1$ may then enter the APU Mode Exit state 208, which illustratively comprises a Normal Mode Initialization State 312 and a Normal Mode Transition State 314.

When the transition condition "APU Request=FALSE" 316 is satisfied, e.g. when an update signal indicative that the APU request is deselected by the pilot or otherwise withdrawn is received, the EECU $122_1$ enters the Normal Mode Initialization State 312. In the Normal Mode Initialization State 312, the EECU $122_1$ illustratively outputs a control signal to the engine $10_1$ to cause the latter to reduce its speed back to the speed threshold, thereby ensuring that the engine $10_1$ is decoupled for satisfying the transition condition "APU Transition Conditions Achieved" 317. Once the transition conditions "APU Transition Conditions Achieved" 317 is satisfied, the EECU $122_1$ enters the Normal Mode Transition state 314 and may send an indication ("APU Actuator Movement In Progress" signal) to the aircraft (i.e. to the APU Actuator Controller 116 via the APUAC 118) that actuator movement is again permitted. In response to receiving the signal from the EECU $122_1$, the APU actuator controller 116 may then send a control signal to the APU actuator of the clutch and APU actuator system 112 to cause the movement of the APU actuator from the second or APU only position towards the first or MGB position for engaging the engine $10_1$ to the main and tail rotors 102, 104. The APU actuator controller 116 then sends the present APU actuator position to the EECU $122_1$ (via the APUAC 118 and communication link 120). Once the EECU $122_1$ determines from the received data that movement of the APU actuator is complete, i.e. the APU actuator is now in the first or APU Actuator Coupled to MGB position, the EECU $122_1$ transitions the APU Actuator Coupled to MGB ("Coupled") indication to 'true' and the APU Actuator Coupled to APU only ("De-coupled") indication to 'false'.

When the transition conditions "De-coupled=FALSE" 318 and "Coupled=TRUE" 320 are satisfied, i.e. the EECU $122_1$ has confirmed that the engine $10_1$ is engaged to the main and tail rotors 102, 104, the EECU $122_1$ may then enter the Normal mode 204. The EECU $122_1$ further outputs a control signal to the engine $10_1$ to cause the latter to adjust (e.g. increase) its speed from the speed threshold (i.e. the APU transition speed) towards a governing speed reference associated with the normal mode of operation.

FIG. 4 also illustrates the APU Accommodation state 210 implemented by the EECU $122_1$ during the APU mode 204 or the interim states (e.g. the APU Mode Initialization State 302, the Transition to APU Mode State 304, the Normal Mode Initialization State 312, and the Transition to Normal Mode State 314) to and from the APU mode 204. In the APU Accommodation state 210, if one or more of the input signals received at the EECU $122_1$ are not in their expected state or if specific faults are detected, the EECU $122_1$ may latch and/or abort the current state and return to the Normal mode 202. When the state is latched, the transition (to/from APU mode 204) is stopped and the engine (e.g. engine $10_1$) remains in neither Normal nor APU mode. This is usually due to a timeout, fault or speed split no longer being present. A new request is illustratively required with no faults present and required engine states to re-initialize the transition to/from APU mode 204. In some embodiments, APU request changing states does not set a State Latched condition 326 but changes the APU actuator direction to remain or return to the previous state if required conditions are met.

In one embodiment, the conditions for transitioning from the APU Mode Entry state 206 (e.g. from the APU Mode Initialization State 302 or the Transition to APU Mode State 304) to the APU Accommodation state 210 are that major faults 322 occur or that the APU Request transitions to false 324 ("APU Request=FALSE"). Examples of major faults include, but are not limited to, engine shutdown, loss of speed signal, and conflicting APU mode request or actuator feedback (e.g. Normal and APU mode set at the same time). When the EECU $122_1$ detects major faults or that the APU request transitions to false (e.g. is withdrawn), the current state (e.g. state 302 or 304) is then latched by the EECU $122_1$, which then enters the "State Latched" state 326. If the transition state is latched, the EECU $122_1$ may reset the "Actuator Movement Transition Available" flag to provide an indication that movement of the actuator may no longer be requested. Once a state is latched, the EECU $122_1$ may further enter an Abort state 328 to abort to the Normal Mode 202 once the conditions "APU Request=FALSE" 324, "Engine Shutdown" 330 (indicative that the engine $10_1$ is shutdown), "Coupled=FALSE", "De-coupled=FALSE" 331 are satisfied, as indicated by the status and position signals received at the EECU $122_1$.

If, during the APU Mode Initialization State 302, the APU mode request transitions to false ("APU Request=FALSE" 324), e.g. is withdrawn before the APU actuator has started to move, and the state is not latched (not needed as the EECU configuration has not changed), the EECU $122_1$ illustratively aborts 328 and returns to the Normal Mode 202. This may occur since the pilot has the ability to cancel the APU mode request before the "Actuator Movement Available" flag is set. Also, the APU mode request may transition to false due to ARINC input word fault at the communication channel 120.

The EECU $122_1$ may further transition from the APU Mode Exit state 208 (e.g. from the Normal Mode Initialization State 312 or the Transition to Normal Mode State 314) to the APU Accommodation state 210 (e.g. to State Latched 326 and Abort state 328) if major faults are detected ("Major Faults" 322). The EECU $122_1$ may also transition from the Normal Mode Initialization State 312 to the Abort state 328 when no major faults are detected and "APU Request=FALSE" 324, "Coupled=FALSE, De-coupled=FALSE" 331, "Engine Shutdown" 330 are satisfied. In addition, the EECU $122_1$ may transition directly from the Transition to Normal Mode State 314 to the APU Mode 204 if the condition "APU Request=TRUE" 306 is satisfied.

In the transition states (e.g. APU Mode Initialization State 302, APU Mode Transition State 304, Normal Mode Initialization State 312, Normal Mode Transition State 314), the EECU $122_1$ may further reset the "APU Mode Transition Available" flag to avoid movement of the APU actuator of the clutch and APU actuator system 112 when the engine $10_1$ is no longer decoupled. This may occur when the difference between the speeds of the engines $10_1$ and $10_2$ is less than a predetermined tolerance that may be stored in memory (e.g. 4%), unless both engines $10_1$, $10_2$ are shutdown). This may also occur when an engine shutdown is commanded on either engine $10_1$, $10_2$ during the transition, resulting in the APU mode transition conditions to no longer be valid. Also, the EECU $122_1$ may reset the "APU Mode Transition Available" flag during a timeout condition, i.e. an expected transition time is exceeded.

The EECU $122_1$ may also enter the APU Accommodation state 210 from the APU Mode 204. In particular, the EECU $122_1$ may enter the Abort state 328 directly from the APU Mode if the "APU Request=FALSE" 324, "Coupled=FALSE, De-coupled=FALSE" 331, "Engine Shutdown" 330 conditions are satisfied. The EECU $122_1$ may further inhibit a start of the APU engine (e.g. engine $10_1$) in the event of a total loss of the Aircraft to EECU Interface, in the illustrated embodiment ARINC input bus 120, ("Dual ARINC Input Word Fault" condition 332) being detected while the engine $10_1$ is shutdown ("Engine Shutdown" condition 330 satisfied). The start inhibit may indeed be performed to prevent possible damage to the gearbox if the gearbox's configuration is undetermined, i.e. not Normal mode and not APU mode. Otherwise, the APU Mode 204 is confirmed and the EECU $122_1$ remains therein. Starts may then only be allowed once the fault is reset and all inputs are confirmed valid.

Figure 5:
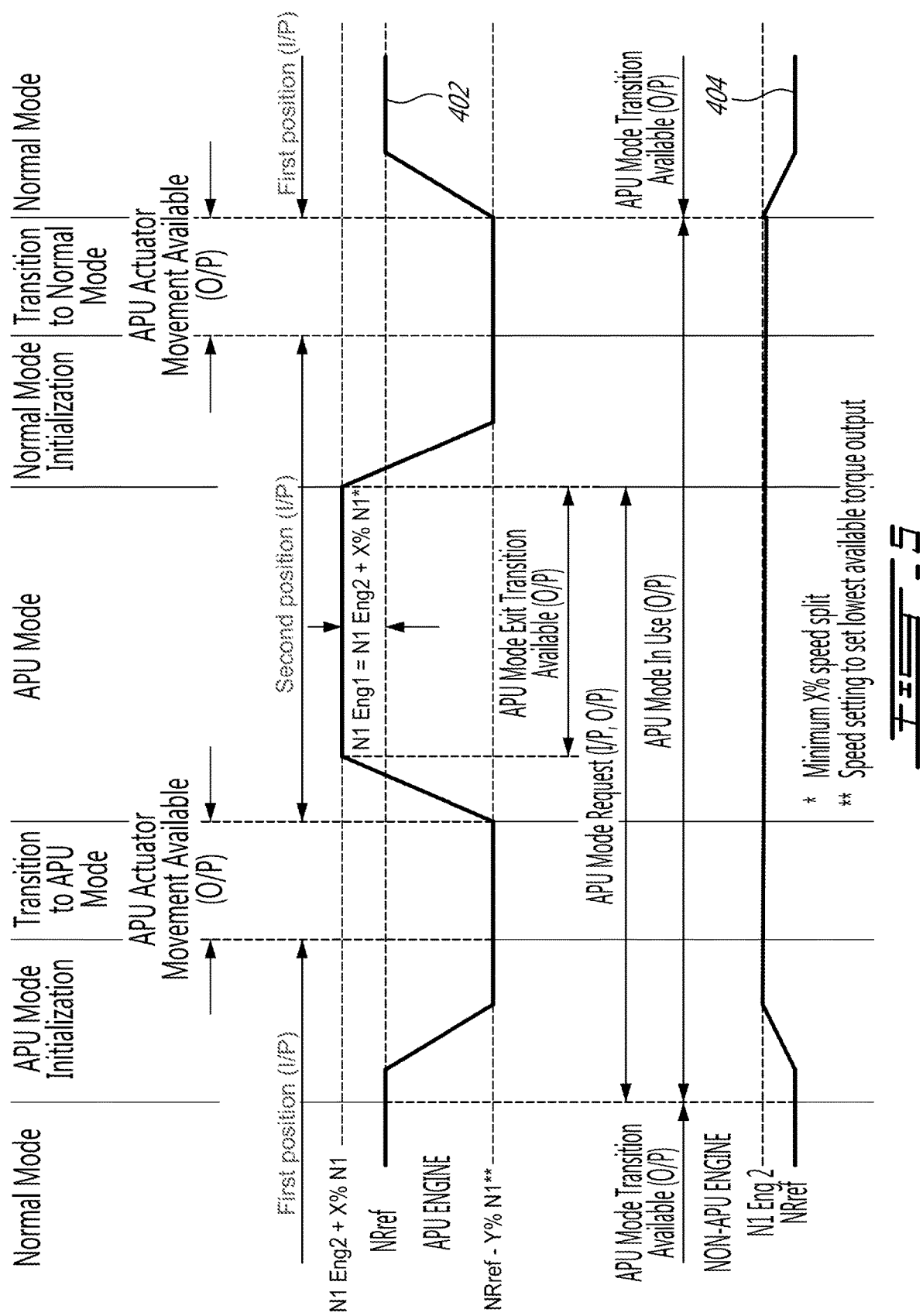
FIG. 5 is a schematic diagram of speed setting and indication scheduling implemented by the EECU of FIG. 2 in transitioning between a normal mode of operation and the APU mode of operation, in accordance with an illustrative embodiment.

FIG. 5 shows an example of an APU speed setting and indication scheduling diagram 400 when APU mode is implemented by the EECU (reference $122_1$ or $122_2$ in FIG. 2) with both engines operating. The diagram 400 illustrates APU mode entry with both APU and non APU aircraft engines (e.g. engines $10_1$ and $10_2$ of FIG. 2) governing at flight speed reference (NRREF). As can be seen in plot 402 of FIG. 5, during the APU Mode Initialization state (reference 302 in FIG. 4), the engine $10_1$ is caused to gradually reduce its speed from the Normal Mode (reference 202 in FIG. 4) speed NRREF to an APU transition speed of NRREF–Y % N1, N1 being the engine's power turbine shaft speed. The APU transition speed NRREF–Y % N1 is illustratively determined as the speed setting to set the lowest available torque output and the value of Y (and that of NRREF) may be predetermined and stored in memory.

Concurrently, the engine $10_2$ is caused to change speed, in the illustrated embodiment gradually increase its speed to a predetermined N1 (N1 Eng 2) with this speed being illustratively maintained in all states other than the Normal Mode 202 (see plot 404).

Upon the EECU $122_1$ entering the APU Mode (reference 204 in FIG. 4), the engine $10_1$ is caused to gradually increase its speed to N1 Eng 2+X % N1, i.e. to have a N1 above that of the engine $10_2$ (as discussed above) with a X % speed split. The value of X (difference between the engine speeds) may be predetermined and stored in memory. Upon the EECU $122_1$ entering the Normal Mode Initialization state (reference 302 in FIG. 4), the engine $10_1$ is then caused to gradually reduce its speed from N1 Eng 2+X % N1 back to the APU transition speed of NRREF-Y % N1. When the Normal Mode 202 is re-entered, the engine $10_1$ then gradually increases its speed back to NRREF (plot 402) while (plot 404) the engine $10_2$ gradually changes its speed from N1 Eng 2 to NRREF.

As also seen in FIG. 5, in the illustrated embodiment, the EECU $122_1$ illustratively receives the "APU Actuator in Coupled to MGB Position" signal during the Normal Mode 202 and the APU Mode Initialization State 302 and the "APU Actuator Coupled to APU only Position" signal during the APU Mode 204 and the Normal Mode Initialization state 302. The "APU Mode Request" signal is input and the "APU Mode Request Confirmed" (not shown in FIG. 5) signal output during the APU Mode Initialization State 302, the Transition to APU Mode State (reference 304 in FIG. 4), and the APU Mode 204. The "APU Mode Transition Available" signal is output by the EECU $122_1$ during the Normal Mode 202, the "APU Mode Exit Transition Available" signal during the APU Mode 204 (once the engine $10_1$ reaches the N1 Eng 2+X % N1 speed), and the "APU Mode In Use" signal during the APU Mode Initialization State 302, the Transition to APU Mode State 302, the APU Mode 204, the Normal Mode Initialization state 302, and the Transition to Normal Mode State (reference 312 in FIG. 4). Also, the "APU Actuator Movement Available" signal is output by the EECU $122_1$ during the Transition to APU Mode State 302 and the Transition State to Normal Mode 312. As discussed above, synchronization between the signals prevents engine instability and ensures proper and timely actuator movement.

Figure 6:
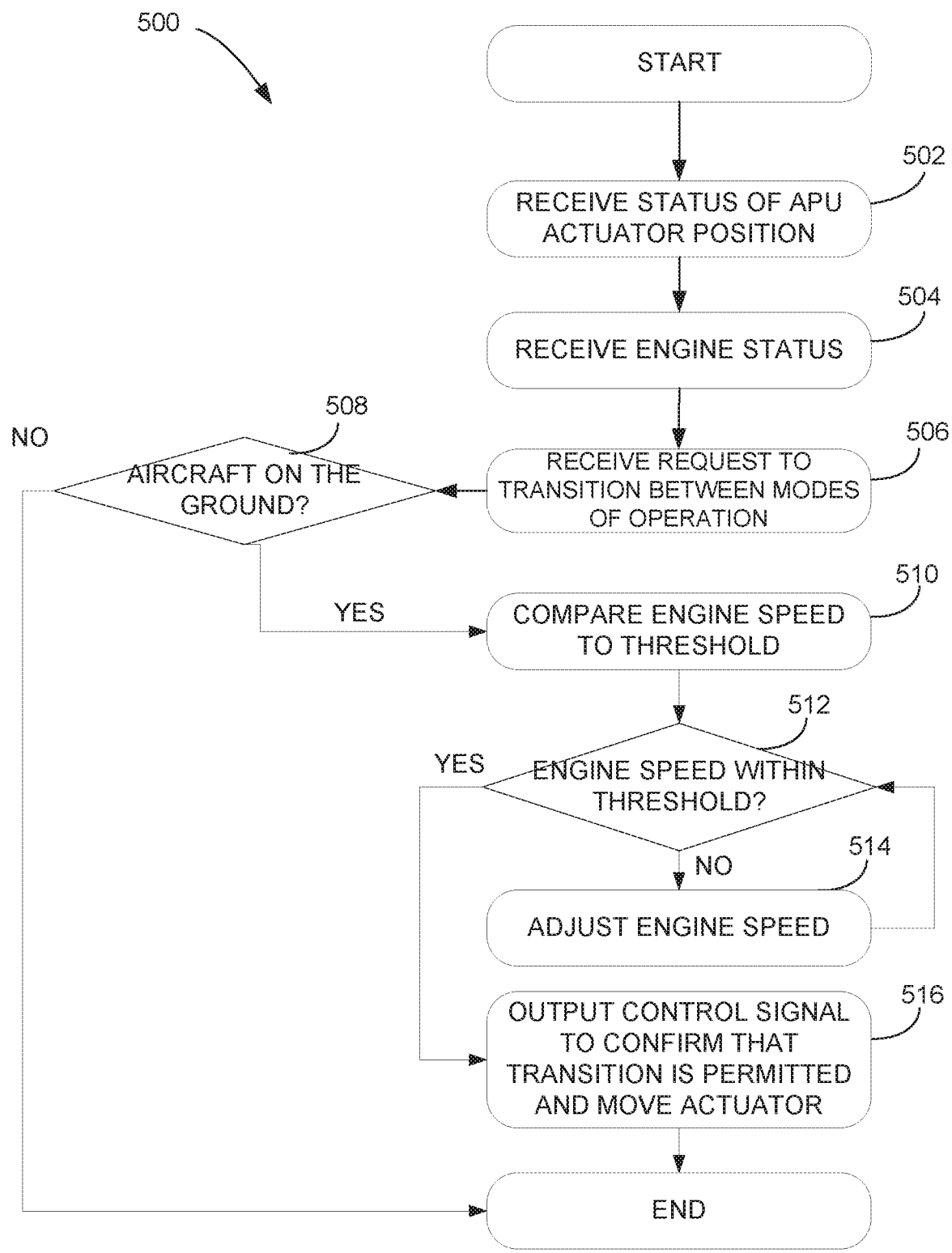
FIG. 6 is a flowchart of a method for controlling a multi-engine aircraft, in accordance with an illustrative embodiment.

Referring now to FIG. 6, a method 500 for controlling a multi-engine aircraft will now be described. The method 500 illustratively comprises receiving at step 502 a position signal indicative of a status (i.e. present position) of the APU actuator position, receiving at step 504 a status signal indicative of a governing state (e.g. a speed) of the engines (references $10_1$, $10_2$ in FIG. 2), and receiving at step 506 a request signal indicative of a request for transitioning between the normal mode and the APU mode, i.e. of moving the APU actuator between the first (MGB) position and the second (APU only) position. The next step 508 may then be to determine (e.g. from an air/ground signal, such as a weight-on-wheels signal) whether the aircraft is on the ground. If this is not the case, the method 500 may end. Otherwise, the speed of the engine that is to be disengaged from or engaged to the main and tail rotors through the APU actuator is compared at step 510 to a predetermined threshold (e.g. an APU transition speed, as discussed above). It is then determined at step 512 whether the engine speed is within (e.g. below) the threshold. If the engine speed is not within the threshold, a control signal is output at step 514 to cause the engine speed to be adjusted towards the threshold. When the engine speed is within the threshold, a control signal is output at step 516 to confirm that the requested transition is permitted and to move the actuator accordingly.

The above description is meant to be exemplary only, and one skilled in the art will recognize that changes may be made to the embodiments described without departing from the scope of the invention disclosed. For example, the engine system may be any suitable system driving an output propulsor(s) on an aircraft, such as helicopter turboshaft engines driving a main rotor, fixed wing turboprop engines driving propellers, or other configurations or combinations thereof. Any suitable number of prime mover engines may be provided on the aircraft, and any suitable number of them may be configured to operate as APU engines. The main gearbox as described herein need not be a reduction or other gearbox, per se, but may be any suitable driving connection between engine(s) and the prime-mover propulsor. Any suitable clutching or engagement/disengagement approach may be employed, and any suitable actuating means for effecting such engagement/disengagement may be employed, as will be appreciated by the skilled reader. Modifications which fall within the scope of the present invention will be apparent to those skilled in the art, in light of a review of this disclosure, and such modifications are intended to fall within the appended claims.

The invention claimed is:

1. An aircraft system comprising:
at least a first engine and a second engine, at least the first engine operatively connected to an accessory drive train for driving an aircraft accessory;
a gearbox operatively connecting at least the first engine and the second engine to a prime mover propulsor of the aircraft;
an actuator operatively associated with at least the first engine and moveable between a first position in which at least the first engine drivingly engages the gearbox for driving the propulsor, and a second position in which at least the first engine is disengaged from the gearbox;
an actuator controller in electrical communication with the actuator and configured to control movement of the actuator; and
at least one processing unit communicatively coupled to the actuator controller via an aircraft avionics system and to at least the first engine and the second engine, the at least one processing unit configured for:
receiving, from the aircraft avionics system, a status of a present position of the actuator, the present position being the first position in which at least the first engine drives the aircraft accessory and drivingly engages the gearbox for driving the propulsor;
receiving, from at least the first engine and the second engine, a status of a present governing state and a present speed of at least the first engine and the second engine;
determining a speed threshold for engaging/disengaging at least the first engine from the gearbox, wherein a value of the speed threshold is set such that substantially zero torque is applied on the gearbox by at least the first engine and a predetermined speed difference is achieved between the present speed of the first engine and the present speed of the second engine when at least the first engine operates at the speed threshold;
receiving, from the aircraft avionics system, a request for movement of the actuator from the first position to the second position;

in response to the request for movement of the actuator, determining whether the aircraft is on the ground;

responsive to determining that the aircraft is on the ground, comparing the present speed of at least the first engine to the speed threshold;

when the present speed of at least the first engine differs from the speed threshold, outputting a first control signal to at least the first engine for causing the present speed of at least the first engine to be adjusted towards the speed threshold and for setting a lowest available torque output for at least the first engine prior to disengaging at least the first engine from the gearbox; and when the present speed of at least the first engine corresponds to the speed threshold, outputting via the aircraft avionics system a second control signal to the actuator controller to indicate that movement of the actuator is permitted and to cause the actuator controller to move the actuator from the first position to the second position, causing at least the first engine to be disengaged from the gearbox and to only drive the aircraft accessory; and responsive to determining that the aircraft is airborne, outputting via the aircraft avionics system a third control signal to the actuator controller to indicate that movement of the actuator between the first position and the second position is not permitted.

2. The system of claim 1, wherein the actuator is interposed between the gearbox and the accessory drive train.

3. The system of claim 1, wherein the at least one processing unit is configured to determine that at least the first engine and the second engine are operating and that a difference between the present speed of at least the first engine and the present speed of the second engine is below a predetermined tolerance and, in response, to output the third control signal indicating that movement of the actuator between the first position and the second position is not available.

4. The system of claim 1, wherein the at least one processing unit is configured to operate in one of a first mode of operation in which the actuator is in the first position and at least the first engine drives the accessory and the propulsor, and a second mode of operation in which the actuator is in the second position and at least the first engine only drives the accessory, and further wherein the at least one processing unit is configured to output the second control signal during a transition between the first mode and the second mode of operation.

5. The system of claim 4, wherein the at least one processing unit is configured to receive an update signal indicating that one of the request for movement is withdrawn and at least one fault has occurred and, in response to the update signal, is further configured to at least one of stop the transition between the first and the second mode of operation and return to the first mode of operation.

6. The system of claim 4, wherein, during the transition between the first mode and the second mode of operation, the at least one processing unit is configured to determine that at least one of the first engine and the second engine is commanded to shutdown and, in response, to output the third control signal indicating that movement of the actuator between the first position and the second position is not available.

7. The system of claim 4, wherein the at least one processing unit is configured to receive an air/ground signal indicating that the aircraft is on the ground.

8. The system of claim 7, wherein, subsequent to the second control signal being output, the at least one processing unit is configured to receive a position signal indicating that the actuator has moved to the second position and, in response, to enter the second mode of operation and output a fourth control signal for causing the present speed of at least the first engine to be adjusted from the predetermined speed threshold towards a first reference speed associated with the second position.

9. The system of claim 8, wherein, upon entering the second mode of operation, the at least one processing unit is configured to output a fifth control signal for causing the second engine to adjust the present speed thereof towards a second reference speed above the first reference speed.

10. A method for controlling an aircraft system, the method comprising, at a processing unit:

receiving, from an aircraft avionics system, a status of a present position of an actuator, the actuator operatively associated with at least a first engine of the aircraft and moveable between a first position in which at least the first engine drives an aircraft accessory and drivingly engages a gearbox for driving a propulsor of the aircraft, and a second position in which at least the first engine is disengaged from the gearbox and only drives the aircraft accessory, the present position being the first position;

receiving, from at least the first engine and the second engine, a status of a present governing state and a present speed of at least the first engine and a second engine;

determining a speed threshold for engaging/disengaging at least the first engine from the gearbox, wherein a value of the speed threshold is set such that substantially zero torque is applied on the gearbox by at least the first engine and a predetermined speed difference is achieved between the present speed of the first engine and the present speed of the second engine when at least the first engine operates at the speed threshold;

receiving, from the aircraft avionics system, a request for movement of the actuator from the first position to the second position;

in response to the request for movement of the actuator, determining whether the aircraft is on the ground;

responsive to determining that the aircraft is on the ground, comparing the present speed of at least the first engine to the speed threshold;

when the present speed of at least the first engine differs from the speed threshold, outputting a first control signal to at least the first engine for causing the present speed of at least the first engine to be adjusted towards the speed threshold and for setting a lowest available torque output for at least the first engine prior to disengaging at least the first engine from the gearbox; and when the present speed of at least the first engine corresponds to the speed threshold, outputting via the aircraft avionics system a second control signal to an actuator controller in electrical communication with the actuator to indicate that movement of the actuator is permitted and to cause the actuator controller to move the actuator from the first position to the second position, causing at least the first engine to be disengaged from the gearbox and to only drive the aircraft accessory; and responsive to determining that the aircraft is airborne, outputting via the aircraft avionics system a third control signal to the actuator controller to indicate that movement of the actuator between the first position and the second position is not permitted.

11. The method of claim 10, further comprising determining that at least the first engine and the second engine are operating and that a difference between the present speed of at least the first engine and the present speed of the second engine is below a predetermined tolerance and, in response, outputting the third control signal indicating that movement of the actuator between the first position and the second position is not available.

12. The method of claim 10, wherein outputting the second control signal is performed during a transition between a first mode of operation and a second mode of operation of the at least one processing unit.

13. The method of claim 12, further comprising, during the transition between the first mode and the second mode of operation, determining that at least one of the first engine and the second engine is commanded to shutdown and, in response, outputting the third control signal indicating that movement of the actuator between the first position and the second position is not available.

14. The method of claim 12, further comprising, prior to outputting the first control signal, receiving an update signal indicating that one of the request for movement is withdrawn and at least one fault has occurred and, in response to the update signal, at least one of stopping the transition between the first and the second mode of operation and returning to the first mode of operation.

15. The method of claim 12, further comprising receiving an air/ground signal indicating that the aircraft is on the ground.

16. The method of claim 15, wherein, subsequent to the second control signal being output, receiving a position signal indicating that the actuator has moved to the second position, and, in response, entering the second mode of operation and outputting a fourth control signal for causing the present speed of at least the first engine to be adjusted from the predetermined speed threshold towards a first reference speed associated with the second position.

17. A system for controlling an aircraft, the system comprising:

means for receiving, from an aircraft avionics system, a status of a present position of an actuator, the actuator operatively associated with at least a first engine of the aircraft and moveable between a first position in which at least the first engine drives an aircraft accessory and drivingly engages a gearbox for driving a propulsor of the aircraft, and a second position in which at least the first engine is disengaged from the gearbox and only drives the aircraft accessory, the present position being the first position;

means for receiving, from at least the first engine and the second engine, a status of a present governing state and a present speed of at least the first engine and a second engine;

means for determining a speed threshold for engaging/disengaging at least the first engine from the gearbox, wherein a value of the speed threshold is set such that substantially zero torque is applied on the gearbox by at least the first engine and a predetermined speed difference is achieved between the present speed of the first engine and the present speed of the second engine when at least the first engine operates at the speed threshold;

means for receiving, from the aircraft avionics system, a request for movement of the actuator from the first position to the second position;

in response to the request for movement of the actuator, means for determining whether the aircraft is on the ground;

responsive to determining that the aircraft is on the ground,
means for comparing the present speed of at least the first engine to the speed threshold;
means for outputting, when the present speed of at least the first engine differs from the speed threshold, a first control signal to at least the first engine for causing the present speed of at least the first engine to be adjusted towards the speed threshold and for setting a lowest available torque output for at least the first engine prior to disengaging at least the first engine from the gearbox; and
means for outputting via the aircraft avionics system, when the present speed of at least the first engine corresponds to the predetermined speed threshold, a second control signal to an actuator controller in electrical communication with the actuator to indicate that movement of the actuator is permitted and to cause the actuator controller to move the actuator from the first position to the second position, causing at least the first engine to be disengaged from the gearbox and to only drive the aircraft accessory; and responsive to determining that the aircraft is airborne, outputting via the aircraft avionics system a third control signal to the actuator controller to indicate that movement of the actuator between the first position and the second position is not permitted.

\* \* \* \* \*